(12) United States Patent
Al-Shalash et al.

(10) Patent No.: US 9,930,690 B2
(45) Date of Patent: Mar. 27, 2018

(54) SYSTEM AND METHOD FOR PROCESSING BUFFER STATUS REPORTS IN RANDOM ACCESS PROCEDURES

(71) Applicant: Futurewei Technologies, Inc., Plano, TX (US)

(72) Inventors: Mazin Ali Al-Shalash, Frisco, TX (US); Zhenzhen Cao, Beijing (CN)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 140 days.

(21) Appl. No.: 14/934,011

(22) Filed: Nov. 5, 2015

(65) Prior Publication Data
US 2016/0135155 A1 May 12, 2016

Related U.S. Application Data

(60) Provisional application No. 62/077,053, filed on Nov. 7, 2014, provisional application No. 62/077,065, filed on Nov. 7, 2014.

(51) Int. Cl.
H04W 4/00 (2009.01)
H04W 72/12 (2009.01)
H04W 72/04 (2009.01)

(52) U.S. Cl.
CPC .... H04W 72/1284 (2013.01); *H04W 72/0486* (2013.01)

(58) Field of Classification Search
CPC .............. H04W 72/1284; H04W 72/0486
USPC ........................................... 370/329
See application file for complete search history.

(56) References Cited

U.S. PATENT DOCUMENTS

| | | | | |
|---|---|---|---|---|
| 2011/0269393 | A1* | 11/2011 | Ostergaard | H04B 7/155 455/7 |
| 2015/0312821 | A1 | 10/2015 | Yamazaki | |
| 2015/0382378 | A1* | 12/2015 | Pan | H04W 4/12 370/328 |
| 2016/0066351 | A1 | 3/2016 | Zhao et al. | |
| 2016/0095133 | A1* | 3/2016 | Hwang | H04L 1/00 370/329 |
| 2016/0374110 | A1* | 12/2016 | Lee | H04W 4/023 |

FOREIGN PATENT DOCUMENTS

| | | |
|---|---|---|
| CN | 103874049 A | 6/2014 |
| CN | 104105088 A | 10/2014 |
| WO | 2014069223 A1 | 5/2014 |
| WO | 2014092616 A1 | 6/2014 |

* cited by examiner

Primary Examiner — Sai-Ming Chan
(74) Attorney, Agent, or Firm — Slater Matsil, LLP

(57) ABSTRACT

A method for requesting communications resources by a user equipment (UE) includes determining that a proximity-based service (ProSe) buffer status report (BSR) trigger condition has been met, determining that a cellular BSR trigger condition has been met, generating a media access control (MAC) protocol data unit (PDU) message comprising only one of a ProSe BSR and a cellular BSR, and sending the MAC PDU message to an evolved NodeB (eNB).

20 Claims, 10 Drawing Sheets

SYSTEM AND METHOD FOR PROCESSING BUFFER STATUS REPORTS IN RANDOM ACCESS PROCEDURES

This application claims the benefit of U.S. Provisional Application No. 62/077,053, filed on Nov. 7, 2014, entitled "System and Method to Report Buffer Status Reports in Random Access Procedure," and U.S. Provisional Application No. 62/077,065, filed on Nov. 7, 2014, entitled "System and Method for Random Access Contention Resolution," which applications are hereby incorporated herein by reference.

TECHNICAL FIELD

The present disclosure relates generally to digital communications, and more particularly to a system and method for processing buffer status reports in random access procedures.

BACKGROUND

Proximity-based service (ProSe) communication, also called device-to-device (D2D) or Sidelink communication, is a kind of direct communication between two user equipments (UEs) in Long Term Evolution (LTE) networks. Before a UE transmits ProSe data, the UE should first obtain ProSe resources. There are two modes to allocate ProSe resources: Mode-1 and Mode-2. In Mode-1, the UE sends a ProSe buffer status report (BSR), which includes buffer status of the ProSe logical channels to the evolved NodeB (eNB), and the eNB allocates ProSe resources to the UE per the ProSe BSR. In Mode-2, the UE selects ProSe resources autonomously in a ProSe resource pool.

SUMMARY OF THE DISCLOSURE

Example embodiments provide a system and method for processing buffer status reports in random access procedures.

In accordance with an example embodiment, a method for requesting communications resources by a user equipment (UE) is provided. The method includes determining, by the UE, that a proximity-based service (ProSe) buffer status report (BSR) trigger condition has been met, determining, by the UE, that a cellular BSR trigger condition has been met, generating, by the UE, a media access control (MAC) protocol data unit (PDU) message comprising only one of a ProSe BSR and a cellular BSR, and sending, by the UE, the MAC PDU message to an evolved NodeB (eNB).

In accordance with another example embodiment, a method for operating an evolved NodeB (eNB) is provided. The method includes receiving, by the eNB, a media access control (MAC) protocol data unit (PDU) message from a user equipment (UE), the MAC PDU comprising only one of proximity-based service (ProSe) buffer status report (BSR) and a cellular BSR, generating, by the eNB, a resource grant including a resource allocation responsive to the one of the ProSe BSR and the cellular BSR, and sending, by the eNB, the resource grant to the UE.

In accordance with another example embodiment, a user equipment (UE) adapted to request communications resources is provided. The UE includes a processor, and a computer readable storage medium storing programming for execution by the processor. The programming including instructions to configure the UE to determine that a proximity-based service (ProSe) buffer status report (BSR) trigger condition has been met, determine that a cellular BSR trigger condition has been met, generate a media access control (MAC) protocol data unit (PDU) message comprising only one of a ProSe BSR and a cellular BSR, and send the MAC PDU message to an evolved NodeB (eNB).

In accordance with another example embodiment, an evolved NodeB (eNB) is provided. The eNB includes a processor, and a computer readable storage medium storing programming for execution by the processor. The programming including instructions to configure the eNB to receive a media access control (MAC) protocol data unit (PDU) message from a user equipment (UE), the MAC PDU comprising only one of proximity-based service (ProSe) buffer status report (BSR) and a cellular BSR, generate a resource grant including a resource allocation responsive to the one of the ProSe BSR and the cellular BSR, and send the resource grant to the UE.

Practice of the foregoing example embodiments provides a system and method for reporting buffer status reports in situations where both cellular and ProSe buffer status reports have been triggered.

Moreover the example embodiments provide random access contention resolution techniques in situations where ProSe buffer status reports have been sent.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to processing buffer status reports in random access procedures. For example, a user equipment (UE) determines that a proximity-based service (ProSe) buffer status report (BSR) trigger condition has been met, determines that a cellular BSR trigger condition has been met, generates a media access control (MAC) protocol data unit (PDU) message comprising only one of a ProSe BSR and a cellular BSR, and sends the MAC PDU message to an evolved NodeB (eNB).

The embodiments will be described with respect to example embodiments in a specific context, namely communications systems that use or support ProSe operation. The disclosure may be applied to standards compliant communications systems, such as those that are compliant with Third Generation Partnership Project (3GPP), IEEE 802.11, and the like, technical standards, and non-standards compliant communications systems, that use or support ProSe operation.

Figure 1:
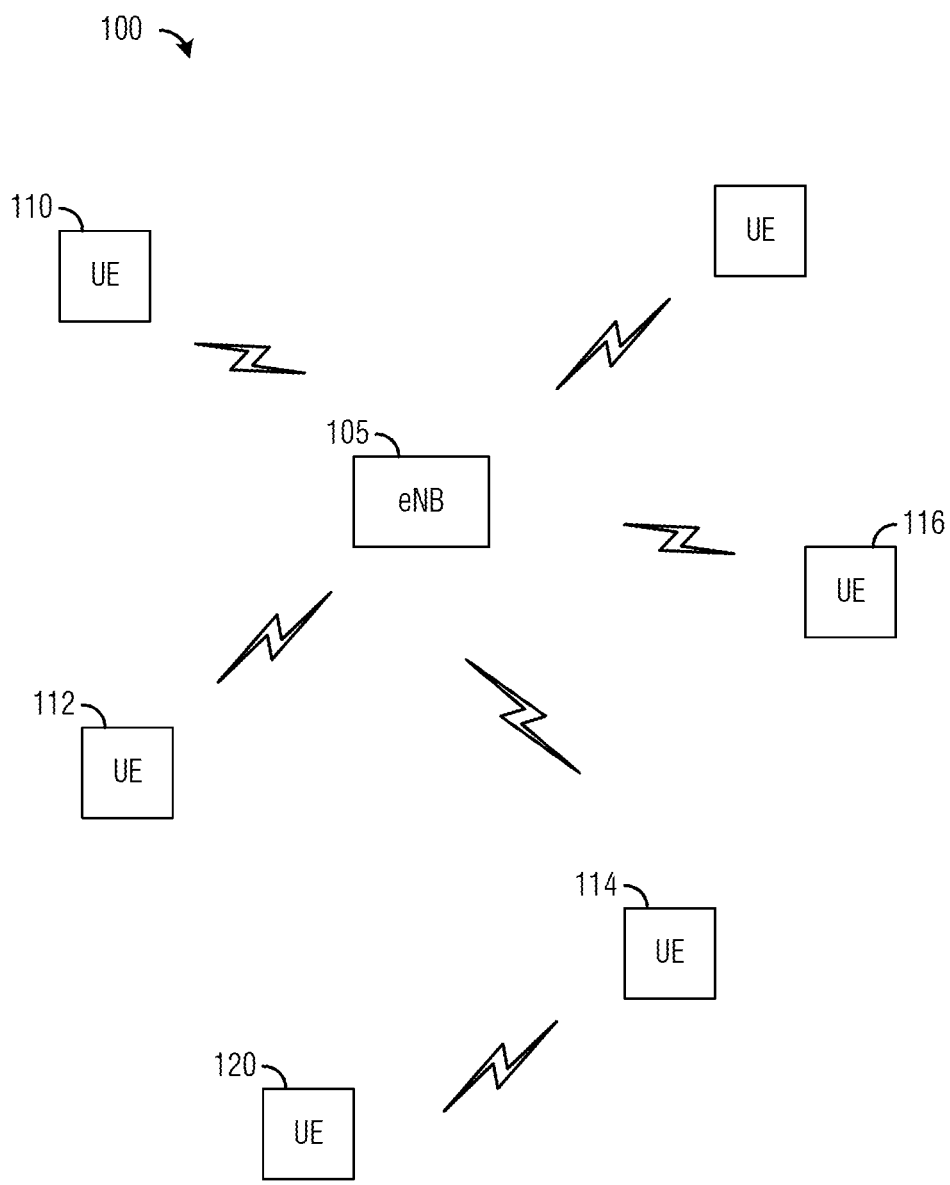
FIG. 1 illustrates an example communications system according to example embodiments described herein.

FIG. 1 illustrates an example communications system 100. Communications system 100 includes an eNB 105 serving a plurality of user equipments, such as UE 110, UE 112, UE 114, and UE 116. The eNB 105 is serving the plurality of UEs by receiving a transmission intended for a UE and then forwarding the transmission to the UE or receiving a transmission from a UE and then forwarding the transmission to its intended destination. In such a communications mode, the eNB 105 and the plurality of UEs are said to be operating in a cellular mode. The eNBs may also be commonly referred to as NodeBs, access points, base stations, controllers, communications controllers, and the like, while UEs may also be commonly referred to as mobiles, mobile stations, terminals, users, subscribers, stations, and the like.

ProSe communications is a different operating mode where UEs can directly transmit to one another without having their transmissions being relayed by an eNB. As shown in FIG. 1, UE 114 is communicating directly with UE 120. UE 114 may be capable of communicating in the cellular mode as well as in the ProSe mode. UE 120 is operating in the ProSe mode, but it may also be possible that UE 120 is capable of operating in the cellular mode with eNB 105 or even with a different eNB (e.g., in another cell). However, such operations involving UE 120 and eNB 105 or another eNB are not shown in FIG. 1.

While it is understood that communications systems may employ multiple eNBs capable of communicating with a number of UEs, only one eNB, and a number of UEs are illustrated for simplicity.

In a 3GPP LTE compliant communications system, when a UE has a requirement for resources, for example, to transmit information or data, the UE may indicate its resource requirement to its serving eNB. The UE may send a BSR or a scheduling request (SR) to its serving eNB, wherein the SR is an explicit request for an uplink resource to be scheduled for this UE, without indicating the amount of information or data that needs to be transmitted, while the BSR provides an indication of the amount of information or data the UE has to transmit, and the serving eNB may or may not provide an uplink resource grant to the UE. An SR is transmitted by the UE on a specific physical uplink control channel (PUCCH) resource allocated by the eNB to the UE. If the UE has an existing uplink resource grant, the UE may include the BSR along with information or data in a transmission(s) in the existing uplink resource grant. If the UE does not have either a PUCCH resource allocated for SR nor an existing uplink resource grant, the UE may participate in the random access procedure involving a random access channel (RACH) in order to obtain an uplink resource grant to transmit the BSR or uplink data.

There are three kinds of ProSe BSR: regular ProSe BSR, periodic ProSe BSR and padding ProSe BSR. The terms ProSe, D2D, and Sidelink are used interchangeably in the art. Therefore, to help reduce confusion, the discussion presented herein will solely use the term ProSe when discussing direct communications between UEs.

A regular ProSe BSR is triggered if one of the following conditions is met:

ProSe-BSR-Trigger-1: Triggered when ProSe data becomes available in currently empty ProSe group(s) and the UE currently has no ProSe data for any other ProSe groups. An empty ProSe group is a ProSe group for which the UE has no ProSe data pending for transmission at that moment in time.

ProSe-BSR-Trigger-2: Triggered when ProSe data becomes available in currently empty ProSe group(s) and the UE currently has ProSe data for another ProSe group. The UE could currently have ProSe data for group-2, and when ProSe data becomes available in group-1, which is currently an empty ProSe group, a regular ProSe BSR is triggered as per ProSe-BSR-Trigger-2.

ProSe-BSR-Trigger-3: Triggered when UE receives the configuration message from the eNB for transition from mode 2 to mode 1 and the UE has data available for transmission. This may occur, for example, if the UE was outside of the coverage of the network and transmitting ProSe communications using mode 2 resource selection, and then moves into the coverage of an eNB and in so doing switches to using mode 1 resource allocation for ProSe communications.

ProSe-BSR-Trigger-4: The ProSe-BSR retransmission timer expires and ProSe data is available in the UE for transmission. This would occur if, for example, the UE has transmitting a ProSe-BSR to the eNB, but has not received an appropriate resource allocation from the eNB to transmit the ProSe communication by time the ProSe-BSR retransmission timer expires.

A periodic ProSe BSR is defined for ProSe communication for the UE to periodically report the updated buffer status of the ProSe logical channels. A periodic ProSe BSR is triggered if a periodic ProSe BSR timer expires.

A padding ProSe BSR is defined for ProSe communication for the UE to report the buffer status of the ProSe logical channels in the padding bits of the uplink (UL) medium access control (MAC) packet data unit (PDU). A padding ProSe BSR is triggered if the padding bits can accommodate a padding ProSe BSR plus its subheader.

Figure 2:
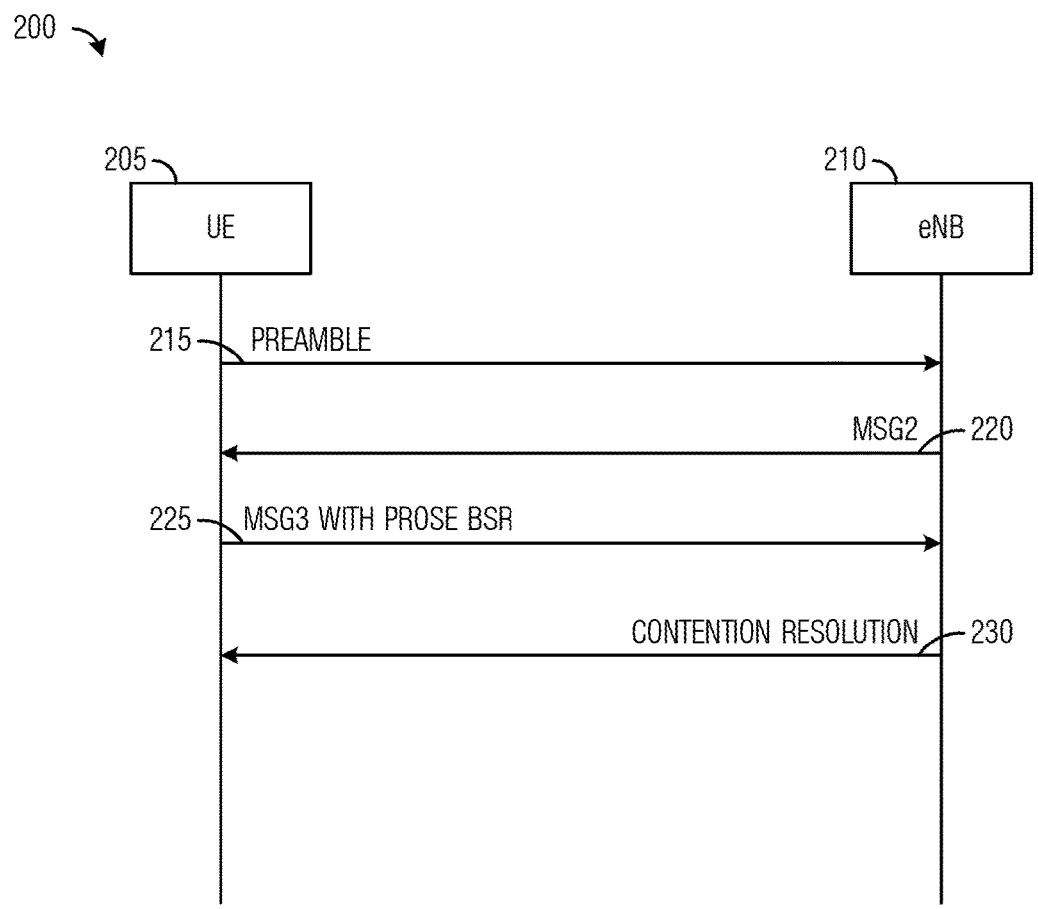
FIG. 2 illustrates a message exchange diagram highlighting an example random access procedure used by a first UE to request ProSe resources to perform ProSe communications with a second UE according to example embodiments described herein.

FIG. 2 illustrates a message exchange diagram 200 highlighting an example random access procedure used by a first UE to request ProSe resources to perform ProSe communications with a second UE. Message exchange diagram 200 shows messages exchanged between a UE 205 and its serving eNB 210. When a regular ProSe BSR is triggered as per one of the four triggering conditions (i.e., ProSe-BSR-Trigger-1/2/3/4), but no dedicated SR physical uplink control channel (PUCCH) resource is configured for this UE, a random access procedure is initiated. UE 205 may participate in a random access procedure to obtain an uplink resource, which would enable UE 205 to transmit control messages to eNB 210 to request ProSe resources. UE 205 may initiate the random access procedure by selecting a preamble out of a group of preambles allocated for use in random access procedures and send the selected preamble to eNB 210 (shown as event 215). The preamble is transmitted in a Physical Random Access Channel (PRACH). UE 205 may also include information identifying itself, such as UE identifying information, media access control (MAC) identifying information, and the like, along with the preamble.

eNB 210 may, after receiving the preamble from UE 205, allocate one or more uplink resources for UE 205. eNB 210 may send a message (MSG2) to UE 205, with the message including information about the uplink resource grant (or equivalently uplink grant) that eNB 210 has allocated in response to receiving the preamble (shown as event 220). The MSG2 may also include the preamble or an indicator of the preamble associated with the uplink resource grant specified in the message. MSG2 may also include a Cell Radio Network Temporary Identifier (C-RNTI 1) for UE 205. The C-RNTI is an identifier that is used to identify subsequent uplink resource grants or downlink scheduling assignments made by eNB 210 to UE 205, which may be communicated to UE 205 using the Physical Downlink Control Channel (PDCCH).

UE 205 may use the uplink resource grant as specified in the MSG2 to send another message (MSG3) to eNB 210 (shown as event 225). As an illustrative example, UE 205 may use the uplink resource to transmit the ProSe BSR towards eNB 210 (as shown as event 225). The ProSe BSR may include an indication of how much data UE 205 has buffered for transmission to the other UE, how many ProSe resources UE 205 needs, and so on.

To complete the random access procedure, eNB 210 and UE 205 may perform contention resolution (CR) (block 230). As an illustrative example of contention resolution, eNB 210 sends a message (MSG4) to UE 205, with MSG4 including a ProSe resource grant (or equivalently ProSe grant). UE 205 considers the MSG4 as contention resolution, thereby satisfying the random access procedure.

It is also possible that a cellular BSR (also commonly referred to as a legacy BSR), which is used to report buffer status of cellular uplink logical channels, is included in the MSG3 as a control element.

There are three kinds of cellular BSR: regular cellular BSR, periodic cellular BSR and padding cellular BSR. Regular cellular BSR is triggered when cellular uplink data becomes available for transmission and the UE has no uplink data pending transmission. Periodic cellular BSR is reported to the eNB periodically, and is triggered when a periodic cellular BSR timer expires. Padding cellular BSR is reported in the padding bits of the UL data.

According to an example embodiment, only random access procedures initiated by the media access control (MAC) sublayer are considered. There may be a plurality of cases if the ProSe BSR is allowed to be reported with the cellular BSR:

Case 1: A regular ProSe BSR and a regular cellular BSR are reported in a MSG3 MAC protocol data unit (PDU), for the random access procedure initiated by the MAC sublayer itself.

Case 2: A regular ProSe BSR and a periodic cellular BSR are reported in a MSG3 MAC PDU, for the random access procedure initiated by the MAC sublayer itself.

Case 3: A regular ProSe BSR and a padding cellular BSR are reported in a MSG3 MAC PDU, for the random access procedure initiated by the MAC sublayer itself.

Case 4: A periodic ProSe BSR and a regular cellular BSR are reported in a MSG3 MAC PDU, for the random access procedure initiated by the MAC sublayer itself.

Case 5: A padding ProSe BSR and a regular cellular BSR are reported in a MSG3 MAC PDU, for the random access procedure initiated by the MAC sublayer itself.

It is noted that it may be complicated to perform contention resolution for a random access procedure if all of the above cases are considered. Therefore, it may be beneficial to not allow some or all of the above cases.

According to an example embodiment, solutions for different possible scenarios where both a ProSe BSR and a cellular BSR may be reported together in a random access procedure are presented. The solutions present what BSR information the UE transmits and in which message, and how the success of contention resolution is defined for each case. The following solutions are introduced to disable some of the cases described above (Case 1/2/3/4/5).

Solution-1: A regular ProSe BSR and a regular cellular BSR are not transmitted in one MSG3 MAC PDU. With Solution-1, when the UE generates a MSG3 MAC PDU in the random access procedure, if a regular cellular BSR is triggered, and a regular ProSe BSR is also triggered, the UE will include a regular cellular BSR in the MSG3 MAC PDU, and the UE will not include a regular ProSe BSR in the MSG3 MAC PDU. After the UE sends the MSG3 MAC PDU with a regular cellular BSR, when the UE receives a UL grant in the physical downlink control channel (PDCCH), the UE considers the contention resolution successful, and the UE considers the random access successfully completed.

With Solution-1, when the UE generates a MSG3 MAC PDU in the random access procedure, if a regular cellular BSR is not triggered, and if a regular ProSe BSR is triggered, the UE will include a regular ProSe BSR in the MSG3 MAC PDU. After the UE sends the MSG3 MAC PDU with a regular ProSe BSR, when the UE receives a ProSe grant in PDCCH, the UE considers the contention resolution successful, and the UE consider the random access successfully completed.

Solution-2: A regular ProSe BSR and a periodic cellular BSR are not transmitted in one MSG3 MAC PDU. With Solution-2, when the UE generates a MSG3 MAC PDU in the random access procedure, if a periodic cellular BSR is triggered, and a regular ProSe BSR is triggered, the UE will include either the regular ProSe BSR or the periodic cellular BSR in the MSG3 MAC PDU, i.e., the UE will not include both the regular ProSe BSR and the periodic cellular BSR in one MSG3 MAC PDU. In the case when the UE includes only a periodic cellular BSR in the MSG3 MAC PDU, after the UE sends the MSG3 MAC PDU with the periodic cellular BSR, when the UE receives a UL grant in PDCCH, the UE considers the contention resolution successful, and the UE considers the random access successfully completed. In the case when the UE includes only a regular ProSe BSR in the MSG3 MAC PDU, after the UE sends the MSG3 MAC PDU with the regular ProSe BSR, when the UE receives a ProSe grant in PDCCH, the UE considers the contention resolution successful, and the UE consider the random access successfully completed.

With Solution-2, when the UE generates a MSG3 MAC PDU in the random access procedure, if a periodic cellular BSR is not triggered, and if a regular ProSe BSR is triggered, the UE will include a regular ProSe BSR in the MSG3 MAC PDU. After the UE sends the MSG3 MAC PDU with a regular ProSe BSR, when the UE receives a ProSe grant in PDCCH, the UE considers the contention resolution successful, and the UE consider the random access successfully completed.

Solution-3: A regular ProSe BSR and a padding cellular BSR are not transmitted in one MSG3 MAC PDU. With Solution-3, when the UE generates a MSG3 MAC PDU in the random access procedure, if a regular ProSe BSR is triggered, and no regular cellular BSR is triggered, and no periodic cellular BSR is triggered, the UE will include a regular ProSe BSR in the MSG3 MAC PDU, and the UE will not include a padding cellular BSR in the MSG3 MAC PDU even if there are padding bits. After the UE sends the MSG3 MAC PDU with a regular ProSe BSR, when the UE receives a ProSe grant in PDCCH, the UE considers the contention resolution successful, and the UE consider the random access successfully completed.

Solution-4: A periodic ProSe BSR and a regular cellular BSR are not transmitted in one MSG3 MAC PDU. With Solution-4, when the UE generates a MSG3 MAC PDU in the random access procedure, if a regular cellular BSR is triggered, and a periodic ProSe BSR is also triggered, the UE will include a regular cellular BSR in the MSG3 MAC PDU, and the UE will not include the periodic ProSe BSR in the MSG3 MAC PDU. After the UE sends the MSG3 MAC PDU with the regular cellular BSR, when the UE receives a UL grant in PDCCH, the UE considers the contention resolution successful, and the UE consider the random access successfully completed.

With Solution-4, when the UE generates a MSG3 MAC PDU in the random access procedure, if a regular cellular BSR is not triggered, and if a periodic ProSe BSR is triggered, the UE will include the periodic ProSe BSR in the MSG3 MAC PDU. After the UE sends the MSG3 MAC PDU with a periodic ProSe BSR, when the UE receives a ProSe grant in PDCCH, the UE considers the contention resolution successful, and the UE consider the random access successfully completed.

Solution-5: A padding ProSe BSR and a regular cellular BSR are not transmitted in one MSG3 MAC PDU. With Solution-5, when the UE generates a MSG3 MAC PDU in the random access procedure, if a regular cellular BSR is triggered, the UE will include a regular cellular BSR in the MSG3 MAC PDU, and the UE will not include a padding ProSe BSR in the MSG3 MAC PDU even if there are padding bits. After the UE sends the MSG3 MAC PDU with a regular cellular BSR, when the UE receives a UL grant in PDCCH, the UE considers the contention resolution successful, and the UE consider the random access successfully completed.

With Solution-1, Case-1 above is eliminated.
With Solution-2, Case-2 above is eliminated.
With Solution-3, Case-3 above is eliminated.
With Solution-4, Case-4 above is eliminated.
With Solution-5, Case-5 above is eliminated.

Figures 3A, 3B:
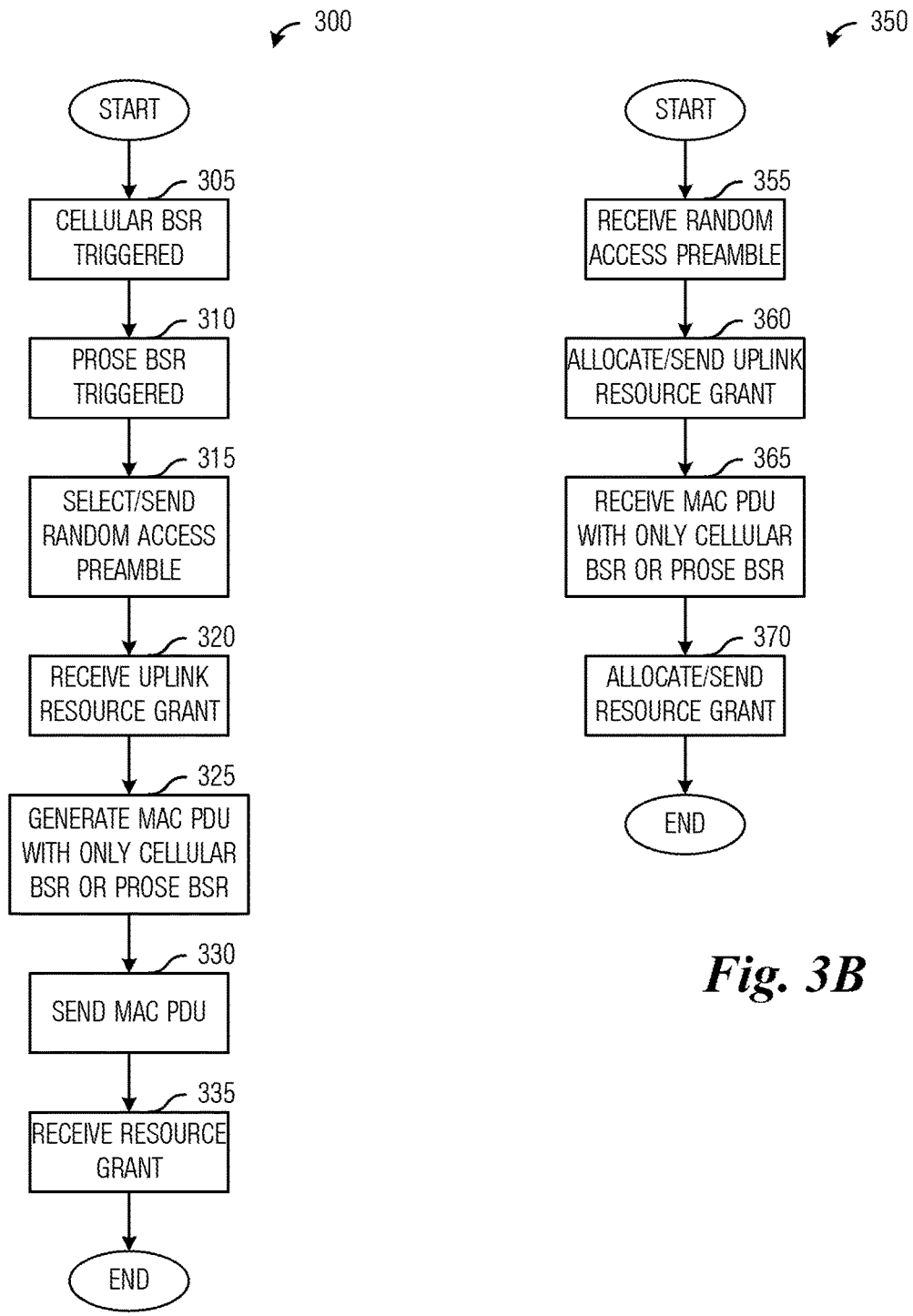
FIG. 3A illustrates a flow diagram of example operations occurring in a UE initiating a random access procedure according to example embodiments described herein.
FIG. 3B illustrates a flow diagram of example operations occurring in an eNB participating in a random access procedure according to example embodiments described herein.

FIG. 3A illustrates a flow diagram of example operations 300 occurring in a UE initiating a random access procedure. Operations 300 may be indicative of operations occurring in a UE as the UE initiates a random access procedure.

Operations 300 begin with the UE determining that a cellular BSR has been triggered (block 305). The cellular BSR may be triggered when any of the conditions discussed previously regarding triggers for cellular BSRs are met. The UE also determines that a ProSe BSR has been triggered (block 310). The ProSe BSR may be triggered when any of the conditions discussed previously regarding triggers for ProSe BSRs are met. The UE selects and sends a random access preamble (block 315). The UE receives a UL resource grant (block 320). The UE generates a MAC PDU that includes only either the cellular BSR or the ProSe BSR and not both (block 325). The UE sends the MAC PDU (block 330). The MAC PDU is sent in MSG3. The UE receives a resource grant in accordance with the BSR included in the MAC PDU (block 335).

FIG. 3B illustrates a flow diagram of example operations 350 occurring in an eNB participating in a random access procedure. Operations 350 may be indicative of operations occurring in an eNB as the eNB participates in a random access procedure.

Operations 350 begin with the eNB receiving a random access preamble (block 355). The eNB allocates and sends an uplink resource grant (block 360). The eNB receives a MAC PDU that includes only either the cellular BSR or the ProSe BSR and not both (block 365). The eNB allocates and sends a resource grant in accordance with the BSR included in the MAC PDU (block 370).

According to an example embodiment, only random access procedures initiated by the MAC sublayer are considered. There are a plurality of scenarios for reporting a ProSe BSR:

Scenario 1: Only a regular ProSe BSR but no cellular BSR is reported in a MSG3 MAC PDU, for the random access procedure initiated the MAC sublayer itself.

Scenario 2: A regular ProSe BSR and a regular cellular BSR are reported in a MSG3 MAC PDU, for the random access procedure initiated the MAC sublayer itself.

Scenario 3: A regular ProSe BSR and a periodic cellular BSR are reported in a MSG3 MAC PDU, for the random access procedure initiated the MAC sublayer itself.

Scenario 4: A regular ProSe BSR and a padding cellular BSR are reported in a MSG3 MAC PDU, for the random access procedure initiated the MAC sublayer itself.

Scenario 5: A periodic ProSe BSR and a regular cellular BSR are reported in a MSG3 MAC PDU, for the random access procedure initiated the MAC sublayer itself.

Scenario 6: A padding ProSe BSR and a regular cellular BSR are reported in a MSG3 MAC PDU, for the random access procedure initiated the MAC sublayer itself.

It is noted that Scenario 2 and Case 1 are equivalent, Scenario 3 and Case 2 are equivalent, Scenario 4 and Case 3, Scenario 5 and Case 4 are equivalent, and Scenario 6 and Case 5 are equivalent.

Contention Resolution for Scenario 1

Figure 4:
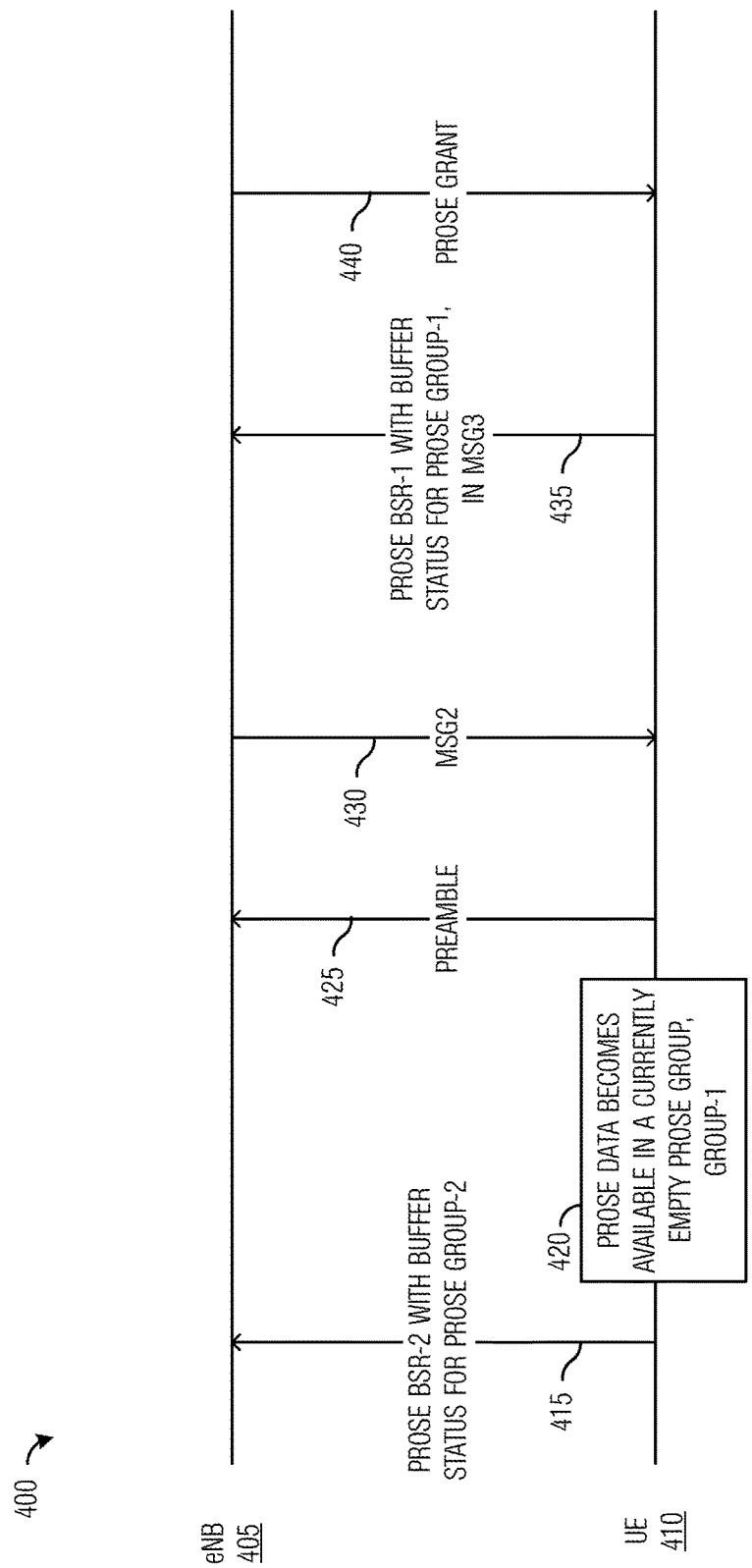
FIG. 4 illustrates a message exchange diagram highlighting contention resolution for Scenario 1 according to example embodiments described herein.

FIG. 4 illustrates a message exchange diagram 400 highlighting contention resolution for Scenario 1. Message exchange diagram 400 displays messages exchanged between an eNB 405 and a UE 410, as well as events occurring at eNB 405 and/or UE 410. UE 410 sends a ProSe BSR (ProSe BSR-2) with buffer status information for a ProSe group-2 (message 415). Before UE 410 receives a response from eNB 405, ProSe data becomes available in a currently empty ProSe group-1 (block 420) and UE 410 initiates a random access procedure by selecting and sending a preamble (message 425). eNB 405 responds with a MSG2 including an uplink resource grant (message 430). UE 410 sends a MAC PDU with a ProSe BSR (ProSe BSR-1) with buffer status information for the ProSe group-1 (message 435). eNB 405 responds with a ProSe grant (message 440).

There are the following sub scenarios for Scenario 1 (i.e., only a regular ProSe BSR but no cellular BSR is reported in a MSG3 MAC PDU).

Scenario 1-1: The regular ProSe BSR reported in MSG3 is triggered due to ProSe-BSR-Trigger-1 or ProSe-BSR-Trigger-3 or ProSe-BSR-Trigger-4. For Scenario 1-1, if the eNB receives the ProSe BSR in MSG3, the eNB schedules ProSe grants to the UE. If the UE receives a ProSe grant, the UE can consider the contention resolution successful, and consider the random access procedure successfully completed.

Scenario 1-2: The Regular ProSe BSR (e.g., ProSe BSR-1) reported in MSG3 is triggered due to ProSe-BSR-Trigger-2, i.e., ProSe data becomes available in a currently empty ProSe group (e.g., group-1), and the UE currently has ProSe data pending for another ProSe group. For Scenario 1-2, if the eNB receives the ProSe BSR in MSG3, the eNB schedules ProSe grants to the UE. However, it is also possible that before the ProSe BSR-1 the UE has already reported another ProSe BSR (e.g., ProSe BSR-2) in which the buffer status for another ProSe group (e.g., group-2) is reported, as shown in FIG. 4. In this scenario, even if the eNB does not receive the ProSe BSR-1 in MSG3, the eNB could still schedule a ProSe grant as per ProSe BSR-2.

For Scenario 1-2, there are some alternative solutions for contention resolution, and one of the alternative solutions can be used for contention resolution for other scenarios.

CR Solution-1: After the eNB receives the ProSe BSR-1 in MSG3 (message 435), the eNB schedules a ProSe grant. If the UE receives a ProSe grant, the UE can consider the contention resolution successful, and consider the random access procedure successfully completed. CR Solution-1 is simple but does not guarantee that the eNB receives the ProSe BSR reported in MSG3.

CR Solution-2: After the eNB receives the ProSe BSR-1 in MSG3 (message 435) with buffer status of ProSe group-1 which has no ProSe data available before, the eNB schedules a ProSe grant, and indicates that the ProSe grant is for ProSe group-1. In other words, the ProSe grant includes an indication of which ProSe group it is associated with. When the UE receives a ProSe grant, and the UE is indicated that the ProSe grant is for ProSe group-1, and ProSe group-1 is the ProSe group triggering the regular ProSe BSR reported in MSG3, the UE can consider the contention resolution successful, and consider the random access procedure successfully completed. CR Solution-2 can guarantee that the eNB receives the ProSe BSR reported in MSG3.

CR Solution-3: After the eNB receives the ProSe BSR-1 in MSG3 (message 435) with buffer status of ProSe group-1 which has no ProSe data available before, the eNB schedules a ProSe grant or a downlink contention resolution message, and indicates that the ProSe grant or a downlink contention resolution message is specifically for contention resolution. In other words, the ProSe grant or the downlink contention resolution message includes an indication that it is to be used for contention resolution. When the UE receives a ProSe grant or a downlink contention resolution message, and the UE is indicated that the ProSe grant or a downlink contention resolution message is for contention resolution, the UE can consider the contention resolution successful, and consider the random access procedure successfully completed. CR Solution-3 can guarantee that the eNB receives the ProSe BSR reported in MSG3.

If CR Solution-1 is used, then for both Scenario 1-1 and Scenario 1-2, when the UE receives a ProSe grant, the UE can consider the contention resolution successful and consider the random access procedure successfully.

Contention Resolution for Scenario 2

One method for contention resolution for Scenario 2 is that if a regular ProSe BSR and a regular cellular BSR are reported in a same MSG3 MAC PDU, the contention resolution can be performed based on both of the regular ProSe BSR and the regular cellular BSR reported in the MSG3.

The UE can perform contention resolution based on the regular cellular BSR. If the UE receives an uplink grant for new transmission, the UE can consider the contention resolution successful, and consider the random access procedure successfully completed.

The UE can perform contention resolution based on the regular ProSe BSR, the following sub scenarios are considered.

Scenario 2-1: The regular ProSe BSR reported in MSG3 is triggered due to ProSe-BSR-Trigger-1 or ProSe-BSR-Trigger-3 or ProSe-BSR-Trigger-4. For Scenario 2-1, same as Scenario 1-1, if the UE receives a ProSe grant, the UE can consider the contention resolution successful, and consider the random access procedure successfully completed.

Scenario 2-2: The regular ProSe BSR (say ProSe BSR-1) reported in MSG3 is triggered due to ProSe-BSR-Trigger-2, i.e., ProSe data becomes available in a currently empty ProSe group (say group-1), and the UE currently has ProSe data for another ProSe group. For Scenario 2-2, same as Scenario 1-2, the UE can perform contention resolution based on one of the CR Solution-1, CR Solution-2 and CR Solution-3 stated above.

An alternative method for contention resolution for Scenario 2 is that, if a regular ProSe BSR and a regular cellular BSR are reported in a same MSG3 MAC PDU, the contention resolution is based on the regular cellular BSR only. When the UE receives an uplink grant for new transmission, the UE can consider the contention resolution successful, and consider the random access procedure successfully completed. However, when the UE receives a ProSe grant for D2D transmission, the UE cannot consider the contention resolution successful, and the UE cannot consider the random access procedure successfully completed.

Contention Resolution for Scenario 3

Figure 5:
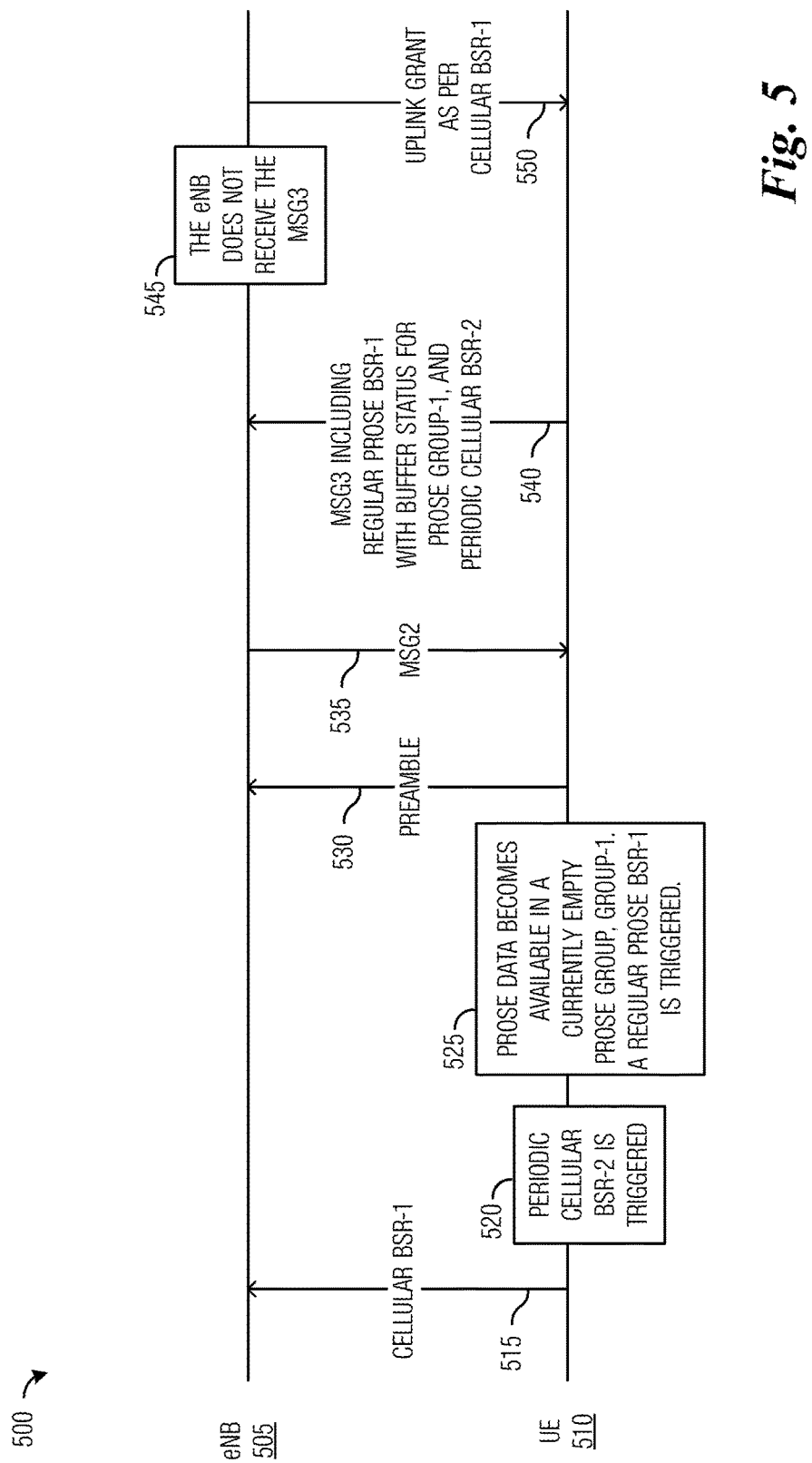
FIG. 5 illustrates a message exchange diagram highlighting contention resolution for Scenario 3 according to example embodiments described herein.

FIG. 5 illustrates a message exchange diagram 500 highlighting contention resolution for Scenario 3. Message exchange diagram 500 displays messages exchanged between an eNB 505 and a UE 510, as well as events occurring at eNB 505 and/or UE 510. UE 510 sends a cellular BSR (cellular BSR-1) (message 515). Before UE 510 receives a response from eNB 505, a periodic cellular BSR-2 is triggered (block 520) and ProSe data becomes available in a currently empty Prose group-1 (block 525), triggering a regular ProSe BSR for ProSe group-1 (ProSe BSR-1). UE 510 initiates a random access procedure by selecting and sending a preamble (message 530). eNB 505 responds with a MSG2 including an uplink resource grant (message 535). UE 510 sends a MAC PDU with a ProSe BSR (ProSe BSR-1) with buffer status information for the ProSe group-1 and a periodic cellular BSR (periodic cellular BSR-2) (message 540). However, eNB 505 does not receive the MSG3 (block 545). Therefore, eNB 505 responds with an uplink grant in accordance with cellular BSR-1 (message 550).

If a regular ProSe BSR and a periodic cellular BSR are reported in a same MSG3 MAC PDU, the contention resolution can be performed based on the regular ProSe BSR. The following sub scenarios are considered.

Scenario 3-1: The regular ProSe BSR reported in MSG3 is triggered due to ProSe-BSR-Trigger-1 or ProSe-BSR-Trigger-3 or ProSe-BSR-Trigger-4. For Scenario 3-1, same as Scenario 1-1, if the UE receives a ProSe grant, the UE can consider the contention resolution successful, and consider the random access procedure successfully completed.

Scenario 3-2: The regular ProSe BSR (say ProSe BSR-1) reported in MSG3 is triggered due to ProSe-BSR-Trigger-2, i.e., ProSe data becomes available in a currently empty ProSe group (say group-1), and the UE currently has ProSe data for another ProSe group. For Scenario 3-2, same as Scenario 1-2, the UE could perform contention resolution based on one of the CR Solution-1, CR Solution-2 and CR Solution-3 stated above.

However, even if the eNB does not receive the MSG3 in which a regular ProSe BSR and a periodic cellular BSR are reported, the eNB could also schedule UL grants to the UE if the eNB has received another cellular BSR before, as shown in FIG. 5. Therefore, when the UE receives a UL grant after sending MSG3 including a regular ProSe BSR and a periodic cellular BSR, the UE cannot know if the eNB received the MSG3 successfully. Therefore, when the UE receives a UL grant after sending MSG3 including a regular ProSe BSR and a periodic cellular BSR, the UE cannot consider the contention resolution successful, and the UE cannot consider the random access procedure successfully completed.

Contention Resolution for Scenario 4

Figure 6:
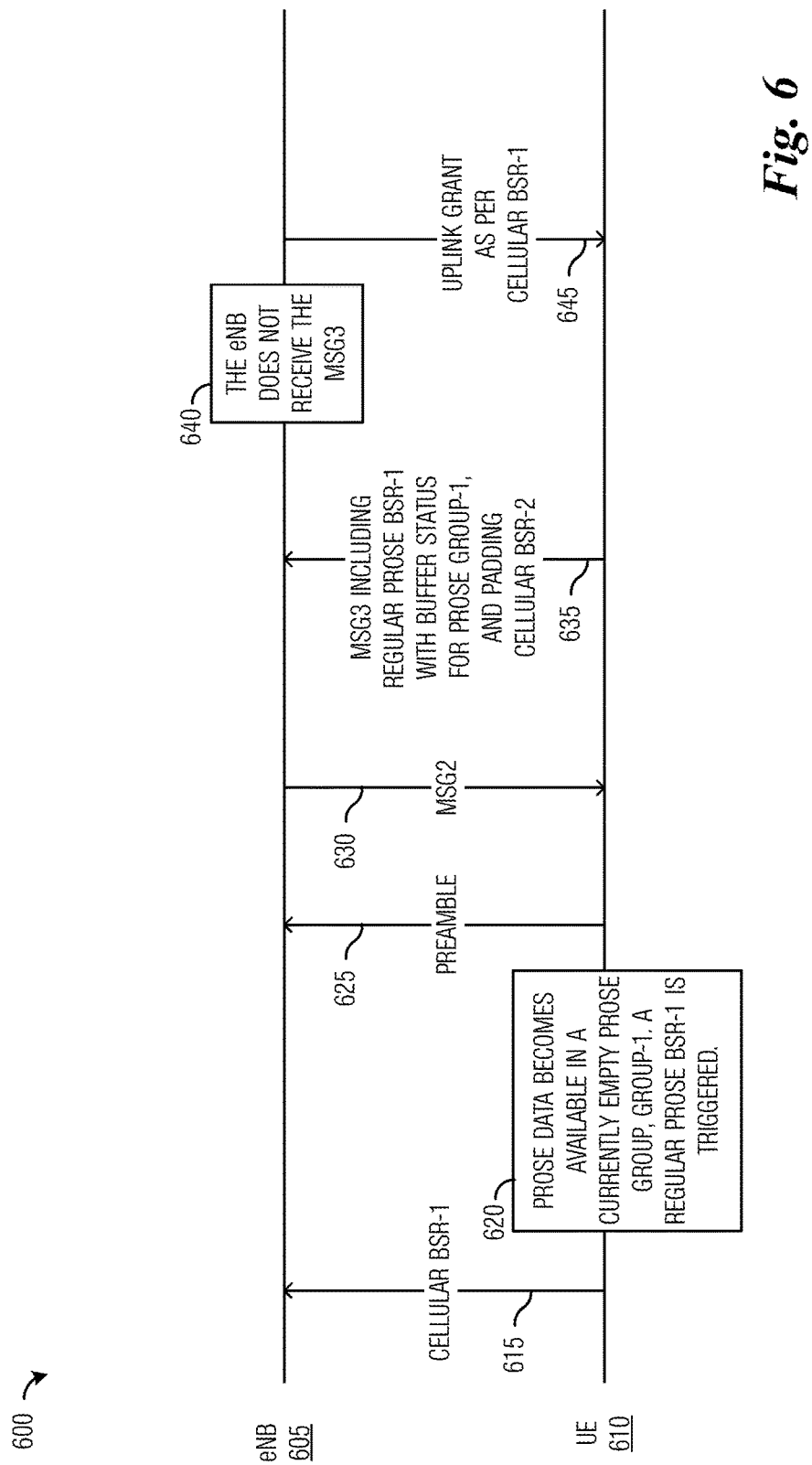
FIG. 6 illustrates a message exchange diagram highlighting contention resolution for Scenario 4 according to example embodiments described herein.

FIG. 6 illustrates a message exchange diagram 600 highlighting contention resolution for Scenario 4. Message exchange diagram 600 displays messages exchanged between an eNB 605 and a UE 610, as well as events occurring at eNB 605 and/or UE 610. UE 610 sends a cellular BSR (cellular BSR-1) (message 615). Before UE 610 receives a response from eNB 605, ProSe data becomes available in a currently empty Prose group-1 (block 620), triggering a regular ProSe BSR for ProSe group-1 (ProSe BSR-1). UE 610 initiates a random access procedure by selecting and sending a preamble (message 625). eNB 605 responds with a MSG2 including an uplink resource grant (message 630). UE 610 sends a MAC PDU with a ProSe BSR (ProSe BSR-1) with buffer status information for the ProSe group-1 and a padding ProSe BSR (padding ProSe BSR-2) (message 635). However, eNB 605 does not receive the MSG3 (block 640). Therefore, eNB 605 responds with an uplink grant in accordance with cellular BSR-1 (message 645).

If a regular ProSe BSR and a padding cellular BSR are reported in a same MSG3 MAC PDU, the contention resolution can be performed based on the regular ProSe BSR. The following sub scenarios are considered.

Scenario 4-1: The regular ProSe BSR reported in MSG3 is triggered due to ProSe-BSR-Trigger-1 or ProSe-BSR-Trigger-3 or ProSe-BSR-Trigger-4. For Scenario 4-1, same as Scenario 1-1, if the UE receives a ProSe grant, the UE can consider the contention resolution successful, and consider the random access procedure successfully completed.

Scenario 4-2: The regular ProSe BSR (say ProSe BSR-1) reported in MSG3 is triggered due to ProSe-BSR-Trigger-2, i.e., ProSe data becomes available in a currently empty ProSe group (say group-1), and the UE currently has ProSe data for another ProSe group. For Scenario 4-2, same as Scenario 1-2, the UE could perform contention resolution based on one of the Solution-1, Solution-2 and Solution-3 stated above.

However, even if the eNB does not receive the MSG3 in which a regular ProSe BSR and a padding cellular BSR are reported, the eNB could also schedule UL grants to the UE if the eNB has received another cellular BSR before, as shown in FIG. 6. Therefore, when the UE receives a UL grant after sending MSG3 including a regular ProSe BSR and a padding cellular BSR, the UE cannot know if the eNB received the MSG3 successfully. Therefore, when the UE receives a UL grant after sending MSG3 including a regular ProSe BSR and a padding cellular BSR, the UE cannot consider the contention resolution successful, and the UE cannot consider the random access procedure successfully completed.

Contention Resolution for Scenario 5

Figure 7:
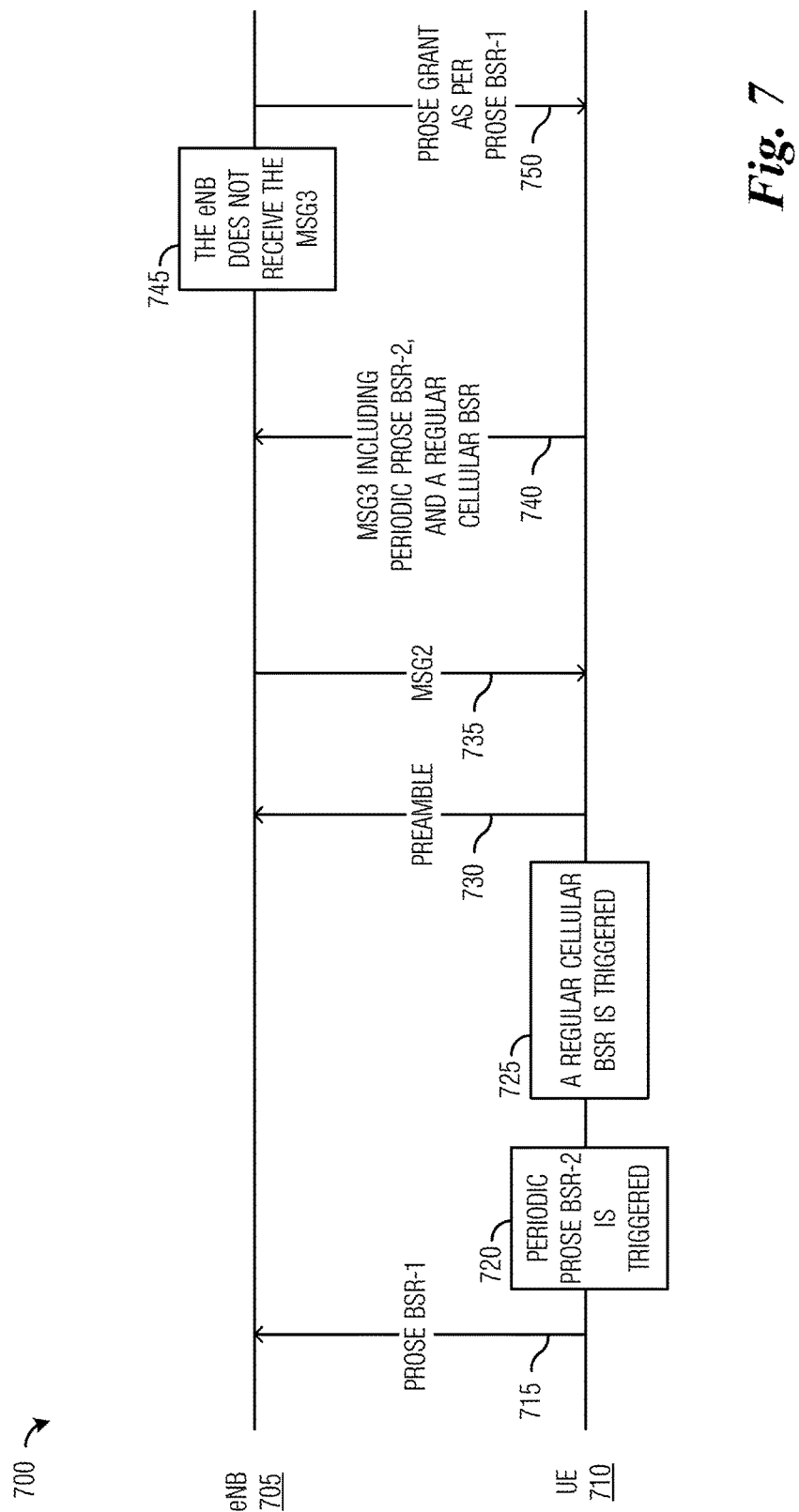
FIG. 7 illustrates a message exchange diagram highlighting contention resolution for Scenario 5 according to example embodiments described herein.

FIG. 7 illustrates a message exchange diagram 700 highlighting contention resolution for Scenario 5. Message exchange diagram 700 displays messages exchanged between an eNB 705 and a UE 710, as well as events occurring at eNB 705 and/or UE 710. UE 710 sends a BSR (ProSe BSR-1) (message 715). Before UE 710 receives a response from eNB 705, a periodic ProSe BSR (periodic ProSe BSR-2) is triggered (block 720) and a regular cellular BSR is triggered (block 725). UE 710 initiates a random access procedure by selecting and sending a preamble (message 730). eNB 705 responds with a MSG2 including an uplink resource grant (message 735). UE 710 sends a MAC PDU with a periodic ProSe BSR (ProSe BSR-2) with buffer status information for the ProSe group-2 and a regular cellular BSR (message 740). However, eNB 705 does not receive the MSG3 (block 745). Therefore, eNB 705 responds with a ProSe grant in accordance with ProSe BSR-1 (message 750).

If a periodic ProSe BSR and a regular cellular BSR are reported in a same MSG3 MAC PDU, the contention resolution can be performed based on the regular cellular BSR. If the UE receives an uplink grant for new transmission, the UE can consider the contention resolution successful, and consider the random access procedure successfully completed.

However, even if the eNB does not receive the MSG3 in which a periodic ProSe BSR and a regular cellular BSR are reported, the eNB could also schedule ProSe grants to the UE if the eNB has received another ProSe BSR before, as shown in FIG. 7. Therefore, when the UE receives a ProSe grant after sending MSG3 including a periodic ProSe BSR and a regular cellular BSR, the UE cannot know if the eNB received the MSG3 successfully. Therefore, when the UE receives a ProSe grant after sending MSG3 including a periodic ProSe BSR and a regular cellular BSR, the UE cannot consider the contention resolution successful, and the UE cannot consider the random access procedure successfully completed.

Contention Resolution for Scenario 6

Figure 8:
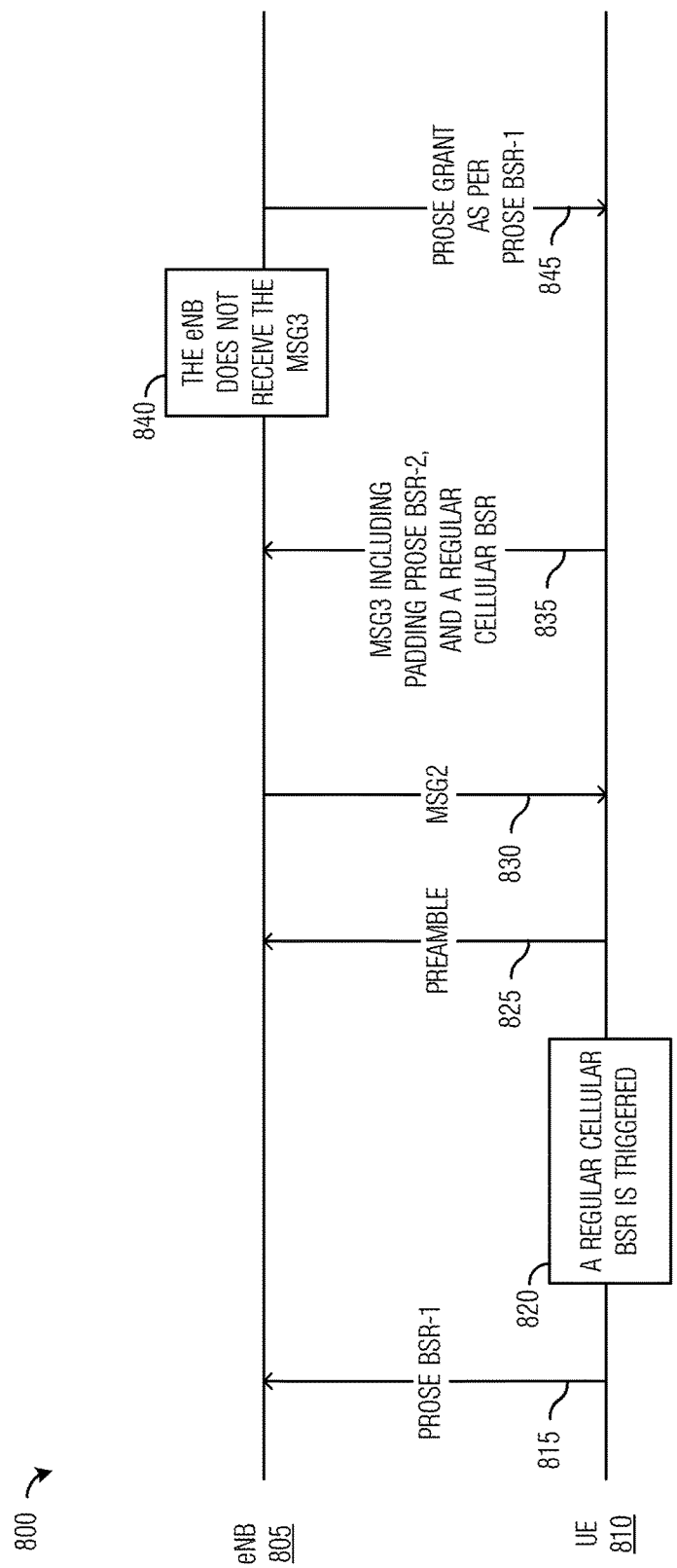
FIG. 8 illustrates a message exchange diagram highlighting contention resolution for Scenario 6 according to example embodiments described herein.

FIG. 8 illustrates a message exchange diagram 800 highlighting contention resolution for Scenario 6. Message exchange diagram 800 displays messages exchanged between an eNB 805 and a UE 810, as well as events occurring at eNB 805 and/or UE 810. UE 810 sends a ProSe BSR (ProSe BSR-1) (message 815). Before UE 810 receives a response from eNB 805, a regular cellular BSR is triggered (block 820). UE 810 initiates a random access procedure by selecting and sending a preamble (message 825). eNB 805 responds with a MSG2 including an uplink resource grant (message 830). UE 810 sends a MAC PDU with a padding ProSe BSR (padding ProSe BSR-2) and a regular cellular BSR (message 835). However, eNB 805 does not receive the MSG3 (block 840). Therefore, eNB 805 responds with a ProSe grant in accordance with ProSe BSR-1 (message 845).

If a padding ProSe BSR and a regular cellular BSR are reported in a same MSG3 MAC PDU, the contention resolution can be performed based on the regular cellular BSR. If the UE receives an uplink grant for new transmission, the UE can consider the contention resolution successful, and consider the random access procedure successfully completed.

However, even if the eNB does not receive the MSG3 in which a padding ProSe BSR and a regular cellular BSR are reported, the eNB could also schedule ProSe grants to the UE if the eNB has received another ProSe BSR before, as shown in FIG. 8. Therefore, when the UE receives a ProSe grant after sending MSG3 including a padding ProSe BSR and a regular cellular BSR, the UE cannot know if the eNB received the MSG3 successfully. Therefore, when the UE receives a ProSe grant after sending MSG3 including a padding ProSe BSR and a regular cellular BSR, the UE cannot consider the contention resolution successful, and the UE cannot consider the random access procedure successfully completed.

Figures 9A, 9B:
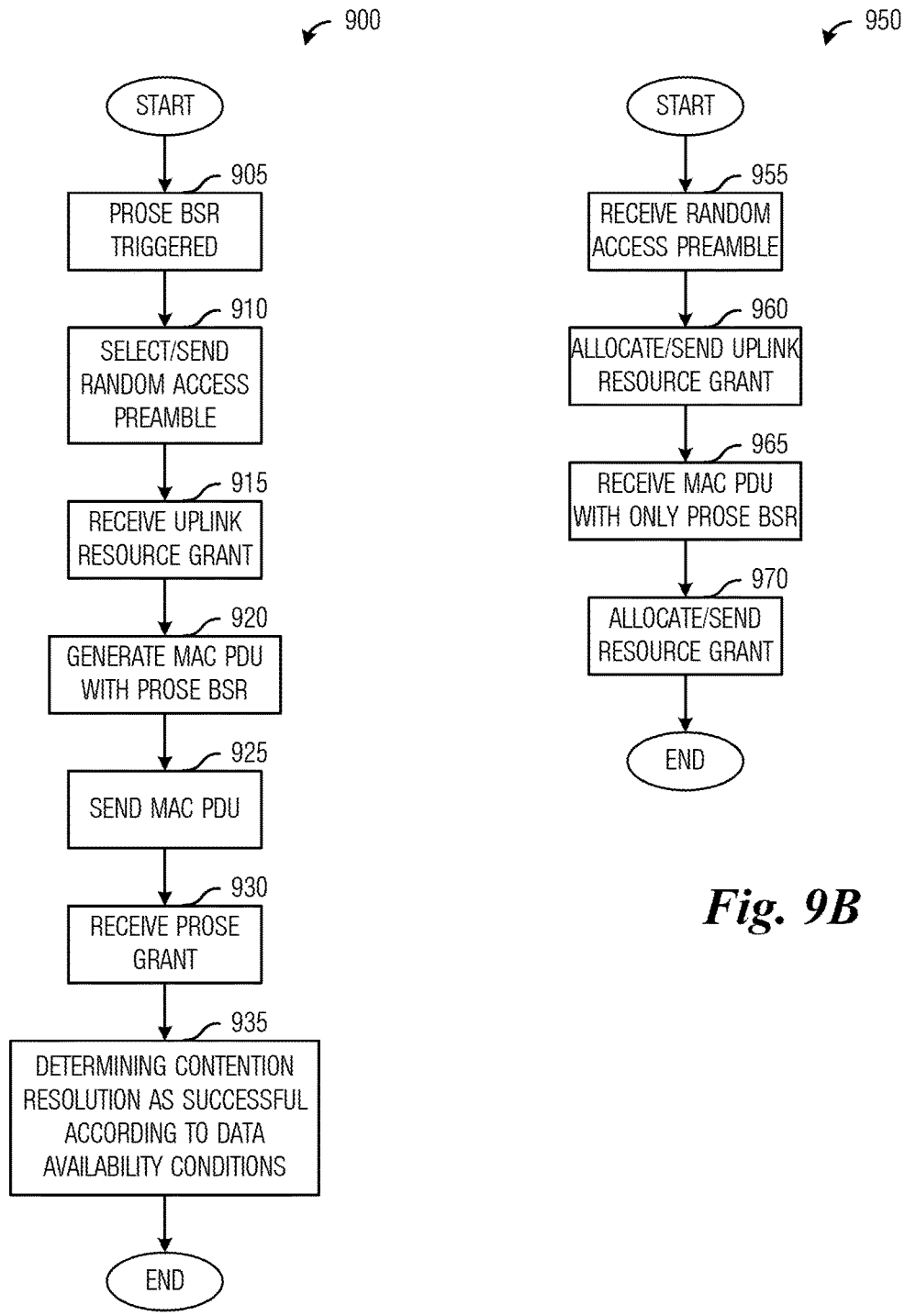
FIG. 9A illustrates a flow diagram of example operations occurring in a UE performing contention resolution according to example embodiments described herein.
FIG. 9B illustrates a flow diagram of example operations occurring in an eNB participating in contention resolution according to example embodiments described herein.

FIG. 9A illustrates a flow diagram of example operations 900 occurring in a UE performing contention resolution. Operations 300 may be indicative of operations occurring in a UE as the UE performs contention resolution.

Operations 900 begin with the UE determining that a ProSe BSR has been triggered (block 905). The ProSe BSR may be triggered when any of the conditions discussed previously regarding triggers for ProSe BSRs are met. The UE selects and sends a random access preamble (block 910). The UE receives a UL resource grant (block 915). The UE generates a MAC PDU that includes the ProSe BSR (block 920). The UE sends the MAC PDU (block 925). The MAC PDU is sent in MSG3. The UE receives a ProSe resource grant in accordance with the BSR included in the MAC PDU (block 930). The UE determines that contention resolution as being successful based on data availability conditions (block 935). The determination of the contention resolution may be in accordance with CR Solution-1/2/3.

FIG. 9B illustrates a flow diagram of example operations 950 occurring in an eNB participating in contention resolution. Operations 950 may be indicative of operations occurring in an eNB as the eNB participates in contention resolution.

Operations 950 begin with the eNB receiving a random access preamble (block 955). The eNB allocates and sends an uplink resource grant (block 960). The eNB receives a MAC PDU that includes a ProSe BSR (block 965). The eNB allocates and sends a ProSe resource grant in accordance with the BSR (block 970). The ProSe resource grant may be used for contention resolution and may be generated in accordance with CR Solution-1/2/3.

Figure 10:
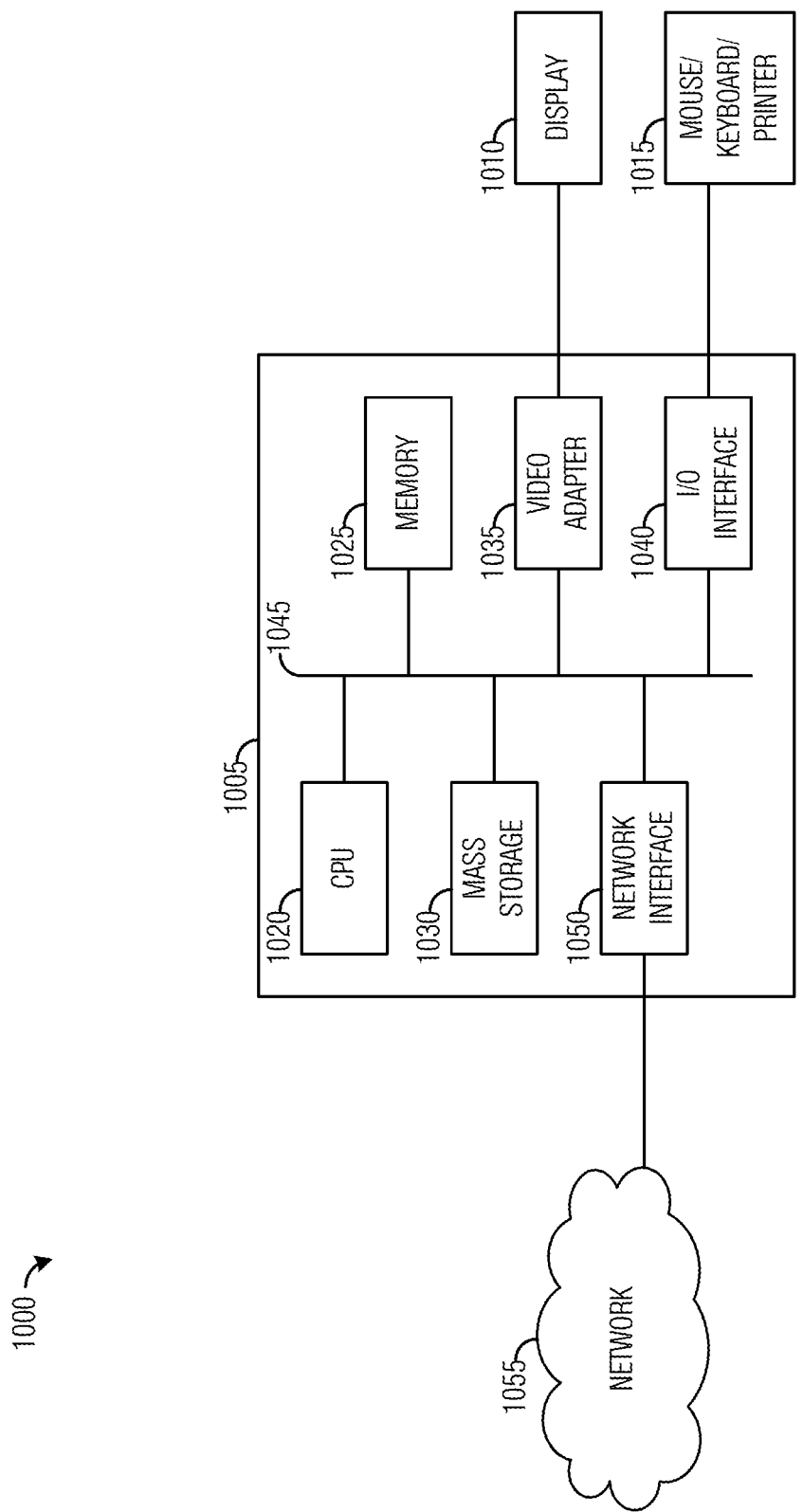
FIG. 10 is a block diagram of a processing system that may be used for implementing the devices and methods disclosed herein.

FIG. 10 is a block diagram of a processing system 1000 that may be used for implementing the devices and methods disclosed herein. In some embodiments, the processing system 1000 comprises a UE. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 1005 equipped with one or more input/output devices, such as a human interface 1015 (including speaker, microphone, mouse, touchscreen, keypad, keyboard, printer, and the like), display 1010, and so on. The processing unit may include a central processing unit (CPU) 1020, memory 1025, a mass storage device 1030, a video adapter 1035, and an I/O interface 1040 connected to a bus 1045.

The bus 1045 may be one or more of any type of several bus architectures including a memory bus or memory controller, a peripheral bus, video bus, or the like. The CPU 1020 may comprise any type of electronic data processor. The memory 1025 may comprise any type of system memory such as static random access memory (SRAM), dynamic random access memory (DRAM), synchronous DRAM (SDRAM), read-only memory (ROM), a combination thereof, or the like. In an embodiment, the memory 1025 may include ROM for use at boot-up, and DRAM for program and data storage for use while executing programs.

The mass storage device 1030 may comprise any type of storage device configured to store data, programs, and other information and to make the data, programs, and other information accessible via the bus 1045. The mass storage device 1030 may comprise, for example, one or more of a solid state drive, hard disk drive, a magnetic disk drive, an optical disk drive, or the like.

The video adapter 1035 and the I/O interface 1040 provide interfaces to couple external input and output devices to the processing unit 1000. As illustrated, examples of input and output devices include the display 1010 coupled to the video adapter 1035 and the mouse/keyboard/printer 1015 coupled to the I/O interface 1040. Other devices may be coupled to the processing unit 1005, and additional or fewer interface devices may be utilized. For example, a serial interface such as Universal Serial Bus (USB) (not shown) may be used to provide an interface for a printer.

The processing unit 1005 also includes one or more network interfaces 1050, which may comprise wired links, such as an Ethernet cable or the like, and/or wireless links to access nodes or different networks 1055. The network interface 1050 allows the processing unit 1005 to communicate with remote units via the networks 1055. For example, the network interface 1050 may provide wireless communication via one or more transmitters/transmit antennas and one or more receivers/receive antennas. In an embodiment, the processing unit 1005 is coupled to a local-area network or a wide-area network 1055 for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for requesting communications resources by a user equipment (UE), the method comprising:
   determining, by the UE, that a proximity-based service (ProSe) buffer status report (BSR) trigger condition has been met;
   determining, by the UE, that a cellular BSR trigger condition has been met;
   generating, by the UE after the ProSe BSR trigger condition and a cellular BSR trigger condition have been met, a media access control (MAC) protocol data unit (PDU) message comprising a ProSe BSR and not a cellular BSR; and sending, by the UE, the MAC PDU message to an evolved NodeB (eNB).

2. The method of claim 1, wherein the ProSe BSR trigger condition is met when a data availability condition is satisfied.

3. The method of claim 2, wherein the data availability condition is satisfied when one of data becomes available for a currently empty first ProSe group, or data is available for a second ProSe group.

4. The method of claim 1, wherein the method further comprises:

receiving a ProSe resource grant from the eNB, the ProSe resource grant indicating a ProSe resource allocated for ProSe communications; and determining that contention resolution for the ProSe BSR was successful.

5. The method of claim 4, wherein the ProSe resource grant is used for contention resolution.

6. The method of claim 4, wherein the ProSe resource grant indicates a ProSe group associated with the allocated ProSe resource.

7. The method of claim 4, wherein the ProSe resource grant indicates that the ProSe resource grant is used for contention allocation.

8. A method for operating an evolved NodeB (eNB), the method comprising:

receiving, by the eNB, a media access control (MAC) protocol data unit (PDU) message from a user equipment (UE) at a time when the UE has uplink data to transmit to the eNB, the MAC PDU comprising a proximity-based service (ProSe) buffer status report (BSR) and not a cellular BSR;

generating, by the eNB, a resource grant including a resource allocation responsive to the ProSe BSR; and sending, by the eNB, the resource grant to the UE.

9. The method of claim 8, wherein the resource grant is used for contention resolution.

10. The method of claim 8, wherein the ProSe BSR is associated with a ProSe group, and wherein the resource grant indicates the ProSe group associated with the allocated ProSe resource.

11. The method of claim 8, wherein the resource grant indicates that the resource grant is used for contention allocation.

12. A user equipment (UE) adapted to request communications resources, the UE comprising:

a processor; and a computer readable storage medium in communication with the processor and storing programming for execution by the processor, the programming including instructions to configure the UE to:

determine that a proximity-based service (ProSe) buffer status report (BSR) trigger condition has been met, determine that a cellular BSR trigger condition has been met, generate, after the ProSe BSR trigger condition and a cellular BSR trigger condition have been met, a media access control (MAC) protocol data unit (PDU) message comprising a ProSe BSR and not a cellular BSR, and send the MAC PDU message to an evolved NodeB (eNB).

13. The UE of claim 12, wherein the ProSe BSR trigger condition is met when a data availability condition is satisfied, and wherein the programming includes instructions to configure the UE to receive a ProSe resource grant from the eNB, the ProSe resource grant indicating a ProSe resource allocated for ProSe communications, and to determine that contention resolution for the ProSe BSR was successful when the data availability condition is satisfied.

14. The UE of claim 13, wherein the ProSe resource grant is used for contention resolution.

15. The UE of claim 13, wherein the ProSe resource grant indicates a ProSe group associated with the allocated ProSe resource allocated.

16. The UE of claim 13, wherein the ProSe resource grant indicates that the ProSe resource grant is used for contention allocation.

17. An evolved NodeB (eNB) comprising:

a processor; and a computer readable storage medium in communication with the processor and storing programming for execution by the processor, the programming including instructions to configure the eNB to:

receive a media access control (MAC) protocol data unit (PDU) message from a user equipment (UE) at a time when the UE has uplink data to transmit to the eNB, the MAC PDU comprising a proximity-based service (ProSe) buffer status report (BSR) and not a cellular BSR, generate a resource grant including a resource allocation responsive to the ProSe BSR, and send the resource grant to the UE.

18. The eNB of claim 17, wherein the resource grant is used for contention resolution.

19. The eNB of claim 17, wherein the ProSe BSR is associated with a ProSe group, and wherein the resource grant indicates the ProSe group associated with the allocated ProSe resource.

20. The eNB of claim 17, wherein the resource grant indicates that the resource grant is used for contention allocation.

* * * * *